United States Patent
Mittal et al.

(10) Patent No.: US 10,210,411 B2
(45) Date of Patent: Feb. 19, 2019

(54) METHOD AND APPARATUS FOR ESTABLISHING FEATURE PREDICTION ACCURACY

(71) Applicant: HERE Global B.V., Eindhoven (NL)

(72) Inventors: Anish Mittal, Berkeley, CA (US); Richard Kwant, Oakland, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/495,044

(22) Filed: Apr. 24, 2017

(65) Prior Publication Data

US 2018/0307930 A1 Oct. 25, 2018

(51) Int. Cl.
| | |
|---|---|
| *G06K 9/00* | (2006.01) |
| *G06K 9/03* | (2006.01) |
| *G06K 9/62* | (2006.01) |
| *G05D 1/02* | (2006.01) |

(52) U.S. Cl.
CPC .......... *G06K 9/036* (2013.01); *G05D 1/0212* (2013.01); *G06K 9/00791* (2013.01); *G06K 9/6279* (2013.01)

(58) Field of Classification Search
CPC ........... G06K 9/00785; G06K 9/00791; G06K 9/00798; G06K 9/00805; G06K 9/00812; G06K 9/00818; G06K 9/00825; G06K 9/00832; G06K 9/00838; G06K 9/00845
See application file for complete search history.

(56) References Cited

U.S. PATENT DOCUMENTS

| | | | | |
|---|---|---|---|---|
| 9,171,485 | B2 | 10/2015 | Gautama et al. | |
| 9,349,189 | B2 | 5/2016 | Zhang et al. | |
| 9,483,700 | B1 | 11/2016 | Chen et al. | |
| 9,884,623 | B2* | 2/2018 | Fasola | B60W 30/12 |
| 2007/0198188 | A1* | 8/2007 | Leineweber | B60W 30/143 |
| | | | | 701/300 |
| 2010/0310129 | A1* | 12/2010 | Hopfner | G06K 9/44 |
| | | | | 382/104 |
| 2011/0150275 | A1* | 6/2011 | Tong | G06T 3/0068 |
| | | | | 382/103 |

(Continued)

OTHER PUBLICATIONS

Ruyi et al., *Lane Detection and Tracking Using a New Lane Model and Distance Transform*, 2011, [online][Retrieved Jan. 26, 2018]. Retrieved from the Internet: <URL: https://cerv.aut.ac.nz/wp-content/uploads/2015/08/MItech-TR-39.pdf>. 20 pages.

*Primary Examiner* — Bobbak Safaipour
(74) *Attorney, Agent, or Firm* — Alston & Bird LLP

(57) ABSTRACT

A method, apparatus, and computer program product are disclosed to estimate the accuracy of feature prediction in an image. Methods may include: receiving a binary ground truth map of pixels and a binary prediction map of pixels, where pixels corresponding to features of an environment are assigned a 1 or a 0, and pixels not corresponding to features of the environment are assigned the other of a 1 or a 0; computing a distance transform at each pixel of the binary ground truth map representing a distance to a closest pixel representing a feature; computing a distance transform at each pixel of the prediction map representing a distance to a closest pixel corresponding to a feature; and establishing accuracy of the prediction map of pixels using the error map of the distance transform for each pixel.

21 Claims, 7 Drawing Sheets

(56) References Cited

U.S. PATENT DOCUMENTS

| | | | |
|---|---|---|---|
| 2011/0276592 A1* | 11/2011 | Gautama | G01C 21/32 |
| | | | 707/769 |
| 2013/0052614 A1 | 2/2013 | Mollicone et al. | |
| 2018/0089505 A1* | 3/2018 | El-Khamy | G06T 7/11 |
| 2018/0129906 A1* | 5/2018 | Habibian | G06K 9/4628 |
| 2018/0129919 A1* | 5/2018 | Tang | G06K 9/4628 |
| 2018/0149487 A1* | 5/2018 | Lee | G01C 21/005 |

\* cited by examiner

| 4.0 | 4.0 | 3.0 | 3.0 | 3.0 | 2.0 | 2.0 | 2.0 |
|---|---|---|---|---|---|---|---|
| 3.0 | 3.0 | 2.0 | 2.0 | 2.0 | 1.0 | 1.0 | 1.0 |
| 2.0 | 2.0 | 1.0 | 1.0 | 1.0 | 1.0 | 0.0 | 0.0 |
| 1.0 | 1.0 | 1.0 | 0.0 | 0.0 | 0.0 | 1.0 | 1.0 |
| 0.0 | 0.0 | 0.0 | 1.0 | 1.0 | 1.0 | 1.0 | 2.0 |
| 1.0 | 1.0 | 1.0 | 1.0 | 2.0 | 2.0 | 2.0 | 3.0 |
| 2.0 | 2.0 | 2.0 | 2.0 | 3.0 | 3.0 | 3.0 | 4.0 |
| 3.0 | 3.0 | 3.0 | 3.0 | 4.0 | 4.0 | 4.0 | 5.0 |
| 4.0 | 4.0 | 4.0 | 4.0 | 5.0 | 5.0 | 5.0 | 6.0 |
| 5.0 | 5.0 | 5.0 | 5.0 | 5.0 | 6.0 | 6.0 | 7.0 |
| 6.0 | 6.0 | 6.0 | 6.0 | 6.0 | 7.0 | 7.0 | 8.0 |
| 7.0 | 7.0 | 7.0 | 7.0 | 7.0 | 8.0 | 8.0 | 9.0 |

FIG. 2

| 5.0 | 5.0 | 4.0 | 4.0 | 4.0 | 3.0 | 3.0 | 3.0 |
|-----|-----|-----|-----|-----|-----|-----|-----|
| 4.0 | 4.0 | 3.0 | 3.0 | 3.0 | 2.0 | 2.0 | 2.0 |
| 3.0 | 3.0 | 2.0 | 2.0 | 2.0 | 1.0 | 1.0 | 1.0 |
| 2.0 | 2.0 | 1.0 | 1.0 | 1.0 | 1.0 | 0.0 | 0.0 |
| 1.0 | 1.0 | 1.0 | 0.0 | 0.0 | 0.0 | 1.0 | 1.0 |
| 0.0 | 0.0 | 0.0 | 1.0 | 1.0 | 1.0 | 1.0 | 2.0 |
| 1.0 | 1.0 | 1.0 | 1.0 | 2.0 | 2.0 | 2.0 | 3.0 |
| 2.0 | 2.0 | 2.0 | 2.0 | 3.0 | 3.0 | 3.0 | 4.0 |
| 3.0 | 3.0 | 3.0 | 3.0 | 4.0 | 4.0 | 4.0 | 5.0 |
| 4.0 | 4.0 | 4.0 | 4.0 | 5.0 | 5.0 | 5.0 | 6.0 |
| 5.0 | 5.0 | 5.0 | 5.0 | 5.0 | 6.0 | 6.0 | 7.0 |
| 6.0 | 6.0 | 6.0 | 6.0 | 6.0 | 7.0 | 7.0 | 8.0 |

FIG. 3

| -1.0 | -1.0 | -1.0 | -1.0 | -1.0 | -1.0 | -1.0 | -1.0 |
|------|------|------|------|------|------|------|------|
| -1.0 | -1.0 | -1.0 | -1.0 | -1.0 | -1.0 | -1.0 | -1.0 |
| -1.0 | -1.0 | -1.0 | -1.0 | -1.0 | -1.0 | -1.0 | -1.0 |
| -1.0 | -1.0 | -1.0 | -1.0 | -1.0 | -1.0 | 1.0  | 1.0  |
| -1.0 | -1.0 | -1.0 | 1.0  | 1.0  | 1.0  | 1.0  | 1.0  |
| 1.0  | 1.0  | 1.0  | 1.0  | 1.0  | 1.0  | 1.0  | 1.0  |
| 1.0  | 1.0  | 1.0  | 1.0  | 1.0  | 1.0  | 1.0  | 1.0  |
| 1.0  | 1.0  | 1.0  | 1.0  | 1.0  | 1.0  | 1.0  | 1.0  |
| 1.0  | 1.0  | 1.0  | 1.0  | 1.0  | 1.0  | 1.0  | 1.0  |
| 1.0  | 1.0  | 1.0  | 1.0  | 1.0  | 1.0  | 1.0  | 1.0  |
| 1.0  | 1.0  | 1.0  | 1.0  | 1.0  | 1.0  | 1.0  | 1.0  |

FIG. 4

METHOD AND APPARATUS FOR ESTABLISHING FEATURE PREDICTION ACCURACY

TECHNOLOGICAL FIELD

Example embodiments of the present invention relate generally to determining the accuracy with which features within images are detected based on pixel analysis, and more particularly, to a method and apparatus for evaluating the precision and recall of feature prediction through image analysis and ground truth pixel map comparison.

BACKGROUND

Road geometry modelling is very useful for three dimensional (3D) map creation and 3D terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern day applications (e.g., 3D mapping, terrain identification, or the like) require the analysis of large amounts of data, and therefore are not practical without quicker or less costly techniques.

Some current methods rely upon feature detection from image data to perform road terrain detection, but these methods have deficiencies. For instance, some systems designed for terrain and feature detection around a vehicle exist, but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors.

BRIEF SUMMARY

Accordingly, a method, apparatus, and computer program product are provided for analyzing the accuracy of detection and location of features that are recognized within an environment. In an example embodiment, a method, apparatus and computer program product are provided that establish the accuracy, including precision and recall, of features using pixel analysis from ground truth maps and prediction maps.

In a first example embodiment, an apparatus is provided including at least one processor and at least one memory including computer program code. The at least one memory and the computer program code may be configured to, with the at least one processor, cause the apparatus to: receive a binary ground truth map where pixels corresponding to features of the environment are assigned a 1 or a 0, and pixels not corresponding to feature of the environment are assigned the other of a 1 or a 0; receive a binary prediction map where pixels corresponding to features of the environment are assigned a 1 or a 0, and pixels not corresponding to feature of the environment are assigned the other of a 1 or a 0; compute a distance transform at each pixel of the binary ground truth map representing a distance to a closest pixel representing a feature; compute a distance transform at each pixel of the prediction map representing a distance to a closest pixel corresponding to a feature; establish accuracy of the prediction map of pixels using the error map of the distance transform for each pixel; and provide the established accuracy of the prediction map for use with an advanced driver assistance system to facilitate guidance of an autonomous vehicle. The binary prediction map of pixels including features in the environment may be generated using a feature prediction algorithm.

According to some embodiments, causing the apparatus to establish accuracy of the prediction map of pixels using the error map of the distance transform at each pixel may include causing the apparatus to: establish a precision of pixels in the prediction map of pixels by causing the apparatus to: determine, for each pixel of the prediction map of pixels representing a feature, a distance transform value of a corresponding pixel of the distance transform of the ground truth map; and determine a percentage of corresponding pixels of the distance transform of the ground truth map having a value below a threshold value. Causing the apparatus to establish accuracy of the prediction map of pixels using the error map of the distance transform at each pixel may include causing the apparatus to establish a recall of features detected in the prediction map of pixels by causing the apparatus to: determine, for each pixel of the ground truth map of pixels representing a feature, a distance transform value of a corresponding pixel of the distance transform of the prediction map; and determine a percentage of corresponding pixels of the distance transform of the prediction map having a value below a threshold value.

An apparatus according to example embodiments may be caused to plot a distribution of errors between the distance transform of the ground truth map of pixels and the distance transform of the prediction map of pixels. The features in the environment may include lane lines, where the distance transform at each pixel of the binary ground truth map comprises a distance of each pixel from a lane line pixel, and where the distance transform at each pixel of the prediction map comprises a distance of each pixel from a lane line pixel. An error map may be generated of the distance transform for each pixel of the ground truth map relative to the distance transform for each pixel of the prediction may including a difference at each pixel between a distance from a lane line to a pixel of the distance transform of the ground truth map of pixels and a distance from a lane line to a corresponding pixel of the distance transform of the prediction map of pixels. An apparatus of example embodiments may optionally be caused to receive a category associated with each feature, where causing the apparatus to establish accuracy of the prediction map includes causing the apparatus to establish accuracy of the prediction map on a per-category basis.

Embodiments of the present invention may provide a computer program product including at least one computer-readable storage medium having computer-executable program code portions stored therein. The computer executable program code portions including program code instructions that, when executed, cause the apparatus to: receive a binary ground truth map of pixels where pixels corresponding to features of an environment are assigned a 1 or a 0, and pixels not corresponding to features of the environment are assigned the other of a 1 or a 0; receive a binary prediction map of pixels where pixels corresponding to features of an environment are assigned a 1 or a 0, and pixels not corresponding to features of the environment are assigned the other of a 1 or a 0; compute a distance transform at each pixel of the binary ground truth map representing a distance to a closest pixel representing a feature; compute a distance transform at each pixel of the prediction map representing a distance to a closest pixel corresponding to a feature; establish accuracy of the prediction map of pixels using the error map of the distance transform for each pixel; and provide the established accuracy of the prediction map for use with an advanced driver assistance system to facilitate guidance of an autonomous vehicle. The binary prediction map of pixels including features in the environment may be generated using a feature prediction algorithm.

According to some embodiments, the program code instructions configured to establish accuracy of the prediction map of pixels using the error map of the distance transform at each pixel includes program code instructions configured to establish a precision of pixels in the prediction map of pixels by causing the apparatus to: determine, for each pixel of the prediction map of pixels representing a feature, a distance transform value of a corresponding pixel of the distance transform of the ground truth map; and determine a percentage of corresponding pixels of the distance transform of the ground truth map having a value below a threshold value. The program code instructions configured to establish accuracy of the prediction map of pixels using the error map of the distance transform at each pixel may include program code instructions configured to establish a recall of features detected in the prediction map of pixels by causing the apparatus to: determine, for each pixel of the ground truth map of pixels representing a feature, a distance transform value of a corresponding pixel of the distance transform of the prediction map; and determine a percentage of corresponding pixels of the distance transform of the prediction map having a value below a threshold.

The computer program product according to some embodiments may include program code instructions configured to cause the apparatus to plot a distribution of errors between the distance transform of the ground truth map of pixels and the distance transform of the prediction map of pixels. The features of the environment may include lane lines, where the distance transform at each pixel of the binary ground truth map may include a distance of each pixel from a lane line pixel, and the distance transform at each pixel of the prediction map may include a distance of each pixel from a lane line. Embodiments may include program code instructions to cause the apparatus to generate an error map of the distance transform for each pixel of the ground truth map relative to the distance transform for each pixel of the prediction may including a difference at each pixel between a distance from a lane line to a pixel of the distance transform of the ground truth map of pixels and a distance from a lane line to a corresponding pixel of the distance transform of the prediction map of pixels. Embodiments may optionally include program code instructions configured to cause the apparatus to receive a category associated with each feature, where causing the apparatus to establish accuracy of the prediction map may include causing the apparatus to establish accuracy of the prediction map on a per-category basis.

Embodiments of the present invention may provide a method including: receiving a binary ground truth map of pixels where pixels corresponding to features of an environment are assigned a 1 or a 0, and pixels not corresponding to features of the environment are assigned the other of a 1 or a 0; receiving a binary prediction map of pixels where pixels corresponding to features of an environment are assigned a 1 or a 0, and pixels not corresponding to features of the environment are assigned the other of a 1 or a 0;

computing a distance transform at each pixel of the binary ground truth map representing a distance to a closest pixel representing a feature; computing a distance transform at each pixel of the prediction map representing a distance to a closest pixel corresponding to a feature; establishing accuracy of the prediction map of pixels using the error map of the distance transform for each pixel; and providing the established accuracy of the prediction map for use with an advanced driver assistance system to facilitate guidance of an autonomous vehicle. The binary prediction map of pixels including features in the environment may be generated using a feature prediction algorithm.

According to some embodiments, establishing accuracy of the prediction map of pixels using the error map of the distance transform at each pixel may include establishing a precision of pixels in the prediction map of pixels by: determining, for each pixel of the prediction map of pixels representing a feature, a distance transform value of a corresponding pixel of the distance transform of the ground truth ma; and determining a percentage of corresponding pixels of the distance transform of the ground truth map having a value below a threshold. Establishing the accuracy of the prediction map of pixels using the error map of the distance transform at each pixel may include establishing a recall of features detected in the prediction map of pixels by: determining, for each pixel of the ground truth map of pixels representing a feature, a distance transform value of a corresponding pixel of the distance transform of the prediction map; and determining a percentage of corresponding pixels of the distance transform of the prediction map having a value below a threshold value.

Embodiments may include plotting a distribution of errors between the distance transform of the ground truth map and the distance transform of the prediction map of pixels. The features in the environment may include lane lines, where the distance transform at each pixel of the binary ground truth map comprises a distance of each pixel from a lane line pixel, and the distance transform at each pixel of the prediction map includes a distance of each pixel from a lane line. Methods may optionally include generating an error map of the distance transform for each pixel of the ground truth map relative to the distance transform for each pixel of the prediction map including a difference at each pixel between a distance from a lane line to a pixel of the distance transform of the ground truth map of pixels and a distance from a lane line to a corresponding pixel of the distance transform of the prediction map of pixels. Methods may include receiving a category associated with each feature, where establishing accuracy of the prediction map may include establishing accuracy of the prediction map on a per-category basis.

Embodiments of the present invention may provide an apparatus including: means for receiving a binary ground truth map of pixels where pixels corresponding to features of an environment are assigned a 1 or a 0, and pixels not corresponding to features of the environment are assigned the other of a 1 or a 0; means for receiving a binary prediction map of pixels where pixels corresponding to features of an environment are assigned a 1 or a 0, and pixels not corresponding to features of the environment are assigned the other of a 1 or a 0; means for computing a distance transform at each pixel of the binary ground truth map representing a distance to a closest pixel representing a feature; means for computing a distance transform at each pixel of the prediction map representing a distance to a closest pixel corresponding to a feature; means for establishing accuracy of the prediction map of pixels using the error map of the distance transform for each pixel; and means for providing the established accuracy of the prediction map for use with an advanced driver assistance system to facilitate guidance of an autonomous vehicle. The binary prediction map of pixels including features in the environment may be generated using a feature prediction algorithm.

According to some embodiments, means for establishing accuracy of the prediction map of pixels using the error map of the distance transform at each pixel may include means for establishing a precision of pixels in the prediction map of pixels using: means for determining, for each pixel of the prediction map of pixels representing a feature, a distance transform value of a corresponding pixel of the distance transform of the ground truth map; and means for determining a percentage of corresponding pixels of the distance transform of the ground truth map having a value below a threshold. The means for establishing the accuracy of the prediction map of pixels using the error map of the distance transform at each pixel may include means for establishing a recall of features detected in the prediction map of pixels using: means for determining, for each pixel of the ground truth map of pixels representing a feature, a distance transform value of a corresponding pixel of the distance transform of the prediction map; and means for determining a percentage of corresponding pixels of the distance transform of the prediction map having a value below a threshold value.

Embodiments may include means for plotting a distribution of errors between the distance transform of the ground truth map and the distance transform of the prediction map of pixels. The features in the environment may include lane lines, where the distance transform at each pixel of the binary ground truth map comprises a distance of each pixel from a lane line pixel, and the distance transform at each pixel of the prediction map includes a distance of each pixel from a lane line. Embodiments may optionally include means for generating an error map of the distance transform for each pixel of the ground truth map relative to the distance transform for each pixel of the prediction map including a difference at each pixel between a distance from a lane line to a pixel of the distance transform of the ground truth map of pixels and a distance from a lane line to a corresponding pixel of the distance transform of the prediction map of pixels. Embodiments may include means for receiving a category associated with each feature, where establishing accuracy of the prediction map may include establishing accuracy of the prediction map on a per-category basis.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
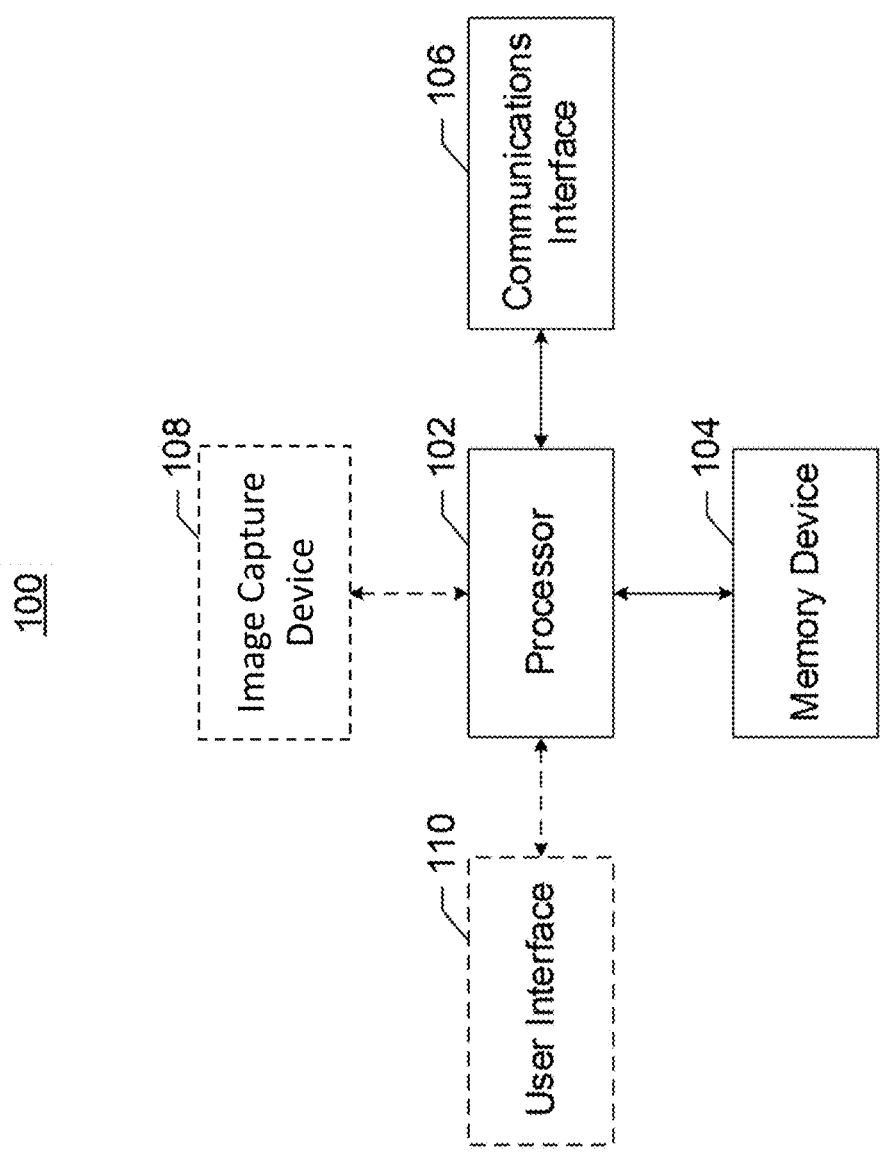
Figure 5:
Figure 6:
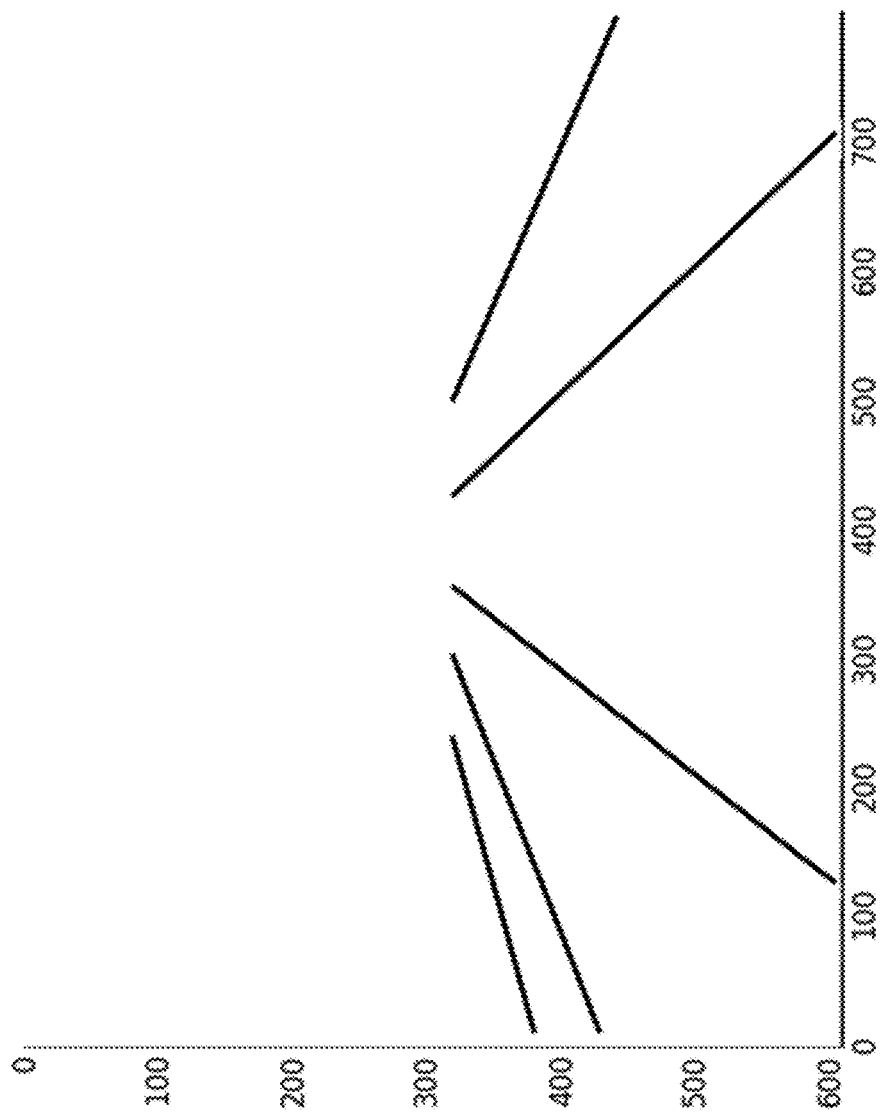
Figure 7:
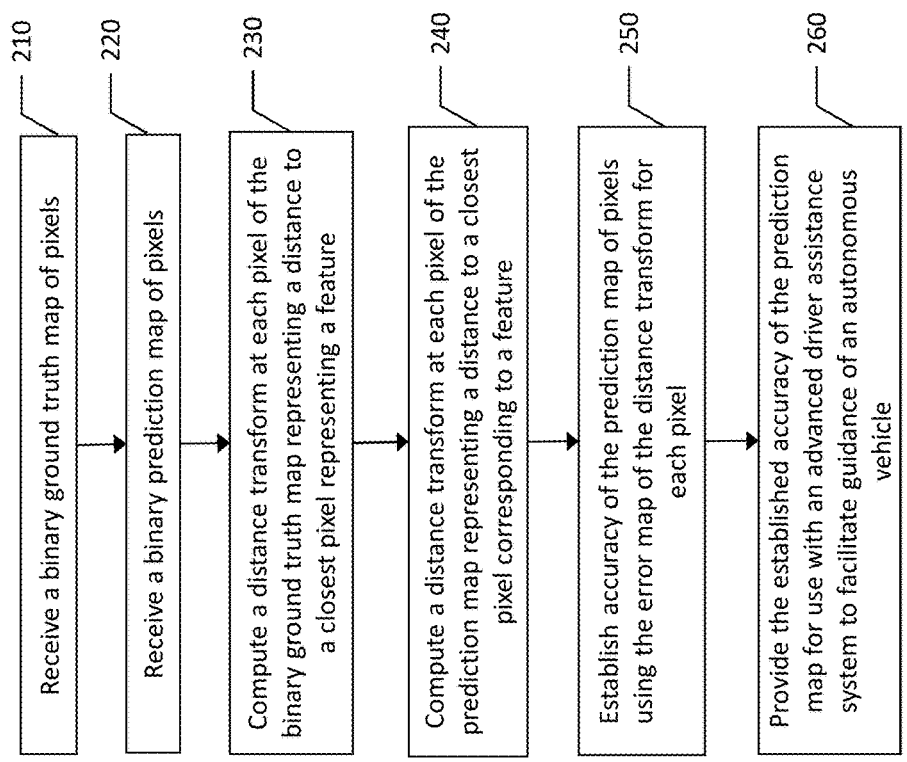

Having thus described certain example embodiments of the present disclosure in general terms, reference will now be made to the accompanying drawings, which are not necessarily drawn to scale, and wherein:

FIG. 1 shows a block diagram of an apparatus that may be specifically configured in accordance with an example embodiment of the present invention;

FIG. 2 is an example of a ground truth binary pixel map including calculated distance transforms according to an example embodiment of the present invention;

FIG. 3 is an example of a prediction binary pixel map including calculated distance transforms according to an example embodiment of the present invention;

FIG. 4 is an example of an error map between the ground truth map of FIG. 2 and the prediction map of FIG. 3 according to an example embodiment of the present invention;

FIG. 5 is an image of a roadway through which ground truth may be established for features depicted in the image according to an example embodiment of the present invention;

FIG. 6 is an illustration of lane lines found in the image of FIG. 5 either through prediction algorithms or through ground truth human interaction according to an example embodiment of the present invention; and FIG. 7 is a flowchart of a method for establishing the accuracy feature prediction in imagery according to an example embodiment of the present invention.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

A method, apparatus, and computer program product are provided in accordance with an example embodiment of the present invention to determine the accuracy of features detected and predicted in an environment through pixel analysis. Methods described herein obtain a full reference measurement that is used to determine feature distance transforms on ground truth and prediction maps, and compare the maps to find an error map to establish the precision and recall of the prediction maps. Understanding object location within an environment is of critical importance for applications such as autonomous driving. When objects and features are detected and their locations established through automated, predictive means, it is imperative to understand the precision of the predicted object and feature locations. It is also imperative to understand the recall with which the predictive means are able to detect each of the features in the environment. The precision and recall of a predictive means for feature detection establish the accuracy of the predictive means and the degree to which they may be relied upon by an autonomous vehicle control system. High precision and recall may enable an autonomous vehicle to function safely and efficiently in an autonomous manner an environment, while a low precision and/or recall may indicate that full autonomy of a vehicle in an environment may not be desirable or safe.

In order to establish the precision and recall, or collectively, accuracy of the prediction maps, feature distance transforms for ground truth maps and prediction maps may be used to find an error of the prediction maps with respect to recall and precision. A binary ground truth image may be an image of an environment in which a value of 1 for a pixel indicates the presence of a feature at that pixel as established by human input or other similarly reliable input that can be trusted, while a value of 0 for a pixel indicates the lack of a feature at that pixel. Similarly, for a binary prediction image may use a value of 1 at a pixel for which a feature is detected, while a value of 0 is assigned to a pixel if no feature is detected. A distance transform may be calculated for each of the ground truth image and the prediction image. The distance transform provides a value at each pixel that is equivalent to the distance of the closest feature pixel from each respective pixel. The distance transforms for the ground truth image and the prediction image can be compared to generate an error map from which the precision and recall can be established, as detailed further below.

While example embodiments described herein can be used to establish the accuracy with which features have been located within a prediction image, certain embodiments may be implemented to establish the accuracy of lane lines from a prediction image to facilitate autonomous driving, for example. The binary feature images, distance transforms, and the error maps may be generated using any of a variety of computing devices. For example, these computing devices may include any of a variety of mobile terminals, such as a portable digital assistant (PDA), mobile telephone, smartphone, laptop computer, tablet computer, desktop computer, server, or any combination of the aforementioned devices. Further, the method, apparatus, and computer program product of an example embodiment may include a networked device, such as a server or other network entity, configured to communicate with one or more devices, such as one or more client devices, such that computing devices may cooperate to perform methods described herein.

Regardless of the type of computing device, an apparatus 100 that is embodied by or associated with the computing device is illustrated in FIG. 1 that may be specifically configured to evaluate features in an image in accordance with an example embodiment of the present invention. It should be noted that while FIG. 1 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 1, the apparatus 100 may include or otherwise be in communication with a processor 102, a memory device 104, a communication interface 106, and optionally an image capture device 108 and a user interface 110. In some embodiments, the processor 102 (and/or co-processor or any other processing circuitry assisting or otherwise associated with the processor) may be in communication with the memory device 104 via a bus for passing information among components of the apparatus. The memory device 104 may be non-transitory and may include, for example, one or more volatile and/or non-volatile memories. In other words, for example, the memory device 104 may be an electronic storage device (e.g., a computer readable storage medium) comprising gates configured to store data (e.g., bits) that may be retrievable by a machine (e.g., a computing device like the processor). As defined herein, a "computer-readable storage medium," refers to a non-transitory physical storage medium (e.g., a volatile or non-volatile memory device) which is distinct from a "computer-readable transmission medium," which may take the form of an electromagnetic signal. The memory device 104 may be configured to store information, data, content, applications, instructions, or the like, for enabling the apparatus to carry out various functions in accordance with an example embodiment of the present invention. For example, the memory device 104 could be configured to buffer input data for processing by the processor 102 or to store image data, using which the apparatus 100 may identify image features. Additionally or alternatively, the memory device 104 could be configured to store instructions for execution by the processor 102.

The processor 102 may be embodied in a number of different ways. For example, the processor may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading.

In an example embodiment, the processor 102 may be configured to execute instructions stored in the memory device 104 or otherwise accessible to the processor. Alternatively or additionally, the processor 102 may be configured to execute hard-coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA, or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., a pass-through display or a mobile terminal) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor 102.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In some embodiments, the apparatus 100 may also include an image capture device 108, which may be any form of device capable of capturing a visual representation of an environment, such as an image of the environment ahead or in front of a vehicle traveling along a roadway. The image capture device may optionally be a camera or sensor configured to capture light reflected off of objects in the environment. The image capture device 108 may optionally include, for example, a LIDAR (light detection and ranging) scanning device, which includes a laser emitter for transmitting laser pulses, and a sensor configured to detect the laser pulses as they return to the LIDAR scanning device to form a pixel map of the environment from the LIDAR data. The image capture device 108 or other element of the apparatus 100 may include one or more geo-referencing systems, such as the Global Positioning System (GPS), precision gyroscopes, or the like. Accordingly, images captured with the image capture device 108 may be associated with a location at which the image was captured, and may also be associated with a heading established based on dynamic analysis of the location or position of the apparatus 100.

Example embodiments described herein may use images having features identified therein, embodiments of an apparatus may include feature detection logic applied by the processor 102 to images from the image capture device 108 to establish the location of features and objects within a captured image. The processor 102 may thus generate a binary prediction image including pixels associated with features identified by a 1, while pixels absent features are identified by a 0. The image capture device 108 may include measurement hardware, such as LIDAR, to establish distances and measurements of features within the environment of the captured image. This measurement may be supplied to the feature detection software to enable processor 102 to more accurately detect and predict feature location in an environment.

While apparatus 100 may include an image capture device 108 in some embodiments, in other embodiments apparatus 100 does not include image capture device 108 and instead is configured to receive image data from another apparatus via communications device 106 or from a user via user interface 110. Accordingly, while some embodiments of the invention enable the capture and analysis of image data within apparatus 100, other embodiments may separate the operations involved in acquiring image data from the operations involved in analyzing the image data to establish features in the environment.

In some embodiments, the apparatus 100 may include a user interface 110 that may, in turn, be in communication with processor 102 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone, and/or the like. The processor and/or user interface circuitry comprising the processor may be configured to control one or more functions of one or more user interface elements through computer program instructions (e.g., software and/or firmware) stored on a memory accessible to the processor (e.g., memory device 104, and/or the like).

Using apparatus 100, embodiments of the present invention may compute distance transforms of features within an image based on ground truth maps and prediction maps, and use those to generate an error map that provides an indication of how reliable the prediction map is relative to the ground truth map. Using methods described herein, quality metrics regarding the prediction maps on a pixel level may be generated including summary statistical analysis of predictive maps. These predictive maps may benefit various other technologies, such as autonomous driving, which requires accurate evaluation of a vehicle and its surroundings to safely navigate a roadway.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, and areas that are navigable by the vehicle. An understanding of where other cars are and what they may do is critical for a vehicle (or apparatus 100) to safely plan a route. Further, vehicles must be able to avoid both static and dynamic obstacles, which may change presence and position in real-time. Autonomous vehicles must also have a semantic understanding of what areas are around them that are navigable and safe for driving. Maps of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, pot holes, etc.) and temporary road changes, such as may be caused by construction.

Autonomous vehicle navigation relies heavily on GPS which can provide a real-time location with a 95% confidence interval of 7.8 meters according to the standards set by governing agencies. However, in complex urban environments, reflection of GPS signals in "urban canyons" can increase the error such that location may be off by as much as 30 meters or more. Given that the width of many vehicle lanes is typically four meters or less, this accuracy is insufficient to properly localize an autonomous vehicle to enable safe route planning decisions. Other sensors, such as inertial measurement units (IMUs) can increase the accuracy of localization by taking into account vehicle movement, but these sensors may drift and fail to provide sufficient accuracy to ensure maximum safety.

Autonomous vehicle navigation requires localization accuracy, and accuracy to within 10 centimeters may provide sufficient accuracy for safety and effectiveness of autonomous navigation. One way to achieve this level of accuracy, as described herein, is through the use of visual odometry, in which features of the environment are detected from imagery. These features detected in the environment can then be matched to a database of features to establish a location.

Visual odometry can be used to determine various features within an environment, such as lane lines of a road to establish the lanes of the road and the boundaries thereof. Lane feature detection algorithms may be used in this regard; however, measurement of their performance may be necessary to ensure accuracy and repeatability. Described herein is a method of establishing the accuracy and repeatability of the detection and measurement of features in an environment. While the methods described herein could be used to establish the accuracy of locationing of a variety of features, example embodiments are described primarily with respect to lane line establishment. Embodiments described herein provide a method of measurement when pixel based lane features are available for prediction maps as well as ground truth maps. Ground truth, as described herein, is established as precise through the use of human input to label features of an image, such as lane lines of an image. Features established through ground truth are used in the form of a ground truth map that depicts their positions within an environment. Prediction maps may be maps of an environment that use algorithms to predict the position of features in the environment. Prediction maps differ from ground truth maps in that prediction maps are the result of automation and algorithms performed according to machine learning or other machine intelligence processes, while ground truth maps are accurate and precise based on human input.

Certain example embodiments described herein disclose a full reference measurement method that is capable of computing feature distance transforms on ground truth and prediction maps, and comparing them to find the error map. A distance transform is a derived representation of a digital image. A distance transform value at a pixel is the determined distance of the pixel from the closest feature pixel. Distance can be measured in Euclidean distance, Cartesian coordinate distance, city-block distance, or the number of pixels that must be traversed between the pixel for which a distance is sought, and the closest feature pixel, among other distance calculation methods. Pixel-level feature prediction can be obtained by feature detection methods such as image processing or learning based establishment of features within the images. Ground truth maps may be obtained through the use of human input to establish the location of features within an image. Using human input, features can be positively identified and categorized as the appropriate feature such that a feature identified by a human is interpreted as "ground truth" and recognized as accurate to a very high degree. A feature may be any element that is distinguishable within an environment. For example, in the field of autonomous vehicle control, a feature may include a lane line, a road edge (curb, transition, soft shoulder, etc.), street signs, traffic signs, or other elements that contribute to or influence the autonomous driving algorithms.

In order to establish the accuracy of a prediction map, a ground truth map may be obtained. This ground truth map may be in binary form, where each pixel is labeled according to whether the pixel represents a feature (e.g., a lane line) or not. A pixel is assigned a value of 1 or a 0 if the pixel includes a detected feature, while a pixel is assigned a value of the other of a 1 or a 0 not used to represent a feature if the pixel does not include a detected feature. A prediction map may be obtained of pixels of the same environment as the ground truth map, where the prediction may also be in binary form using the same formula as above, where each pixel is assigned a value according to whether the prediction algorithm believes the pixel represents a feature. The images associated with the ground truth map and the prediction map may not be identical, but may be aligned according to image processing such that features may be substantially aligned.

For each of the ground truth map and the prediction map, a distance transform may be computed. The distance transform involves assigning a value to each pixel, where the value represents a distance from the closest feature of the respective map. FIG. 2 illustrates a finite pixel map with distance transform values assigned. The shaded pixels represent features, such as a lane line of a section of an image, while the values within the remaining blocks or "pixels" are determined based on how far they are from the feature. The shading of FIG. 2 is illustrative of the binary feature map, where a shaded pixel may have a value of 1 indicating a feature is present, while an unshaded pixel has a value of 0 indicating no feature is present. Any distance measure can be used, whether a recognized length measure, such as millimeters, or a pixel count measure as shown in FIG. 2, where the distance is the number of pixels from the feature or the number of pixels that must be traversed to arrive at the closest feature pixel. Distance can be measured in Euclidean distance, X-Y coordinate distance, or the like.

In an example embodiment, FIG. 2 may represent the ground truth map distance transform, and FIG. 3 may represent the prediction map distance transform. As shown, the feature pixels have shifted left in FIG. 3 relative to FIG. 2. Comparing the distance transforms of FIGS. 2 and 3 yields an error map as illustrated in FIG. 4, where the difference between the ground truth map distance transform of FIG. 2 and the prediction map distance transform of FIG. 3 is shown as a pixel value corresponding to the error between the two distance transforms. FIGS. 2 through 4 are simplistic examples of the methods described herein which, in practice, are performed on image maps of considerably higher complexity. Distance may be calculated in various manners including calculations based on a mean-squared distance between corresponding pixels of the ground truth map relative to the prediction map.

FIG. 5 illustrates an image captured of a roadway including a plurality of lane lines as features. The lane line features may be identified by a human as lane lines to form a ground truth map, or predicted through image analysis and/or machine learning to generate a prediction map. FIG. 6 illustrates an example map, which may correspond to either the ground truth map or the prediction map, with the lane lines recognized. The distance transforms may be generated from a map similar to that of FIG. 6, where the distance transforms may resemble a "heat map" or map with a first color proximate the lane lines, transitioning to another color or shade as the distance from the lane lines increases. From these distance transform maps of each of the ground truth map and the prediction map, an error map illustrating the difference between the two distance transform maps may be generated.

According to some embodiments, the distribution of errors for ground truth pixels and prediction pixels from their respective maps may be plotted. A threshold error map may count the percentage of ground truth pixels and prediction pixels that are found in order to compute metrics related to the prediction map. These metrics may include precision and recall.

The precision may be established based on how closely the prediction map mapped each of the lane lines to a ground truth lane line. The precision may be calculated by finding the indices in the binary prediction image that indicate the presence of a feature (e.g., the pixels with a value of 1). For each index (i.e., feature pixel), find the distance transform by looking up in the ground truth distance transform map. The pixel is considered as a "hit" in an instance in which a distance in the ground truth distance transform map for the pixel corresponding to the index pixel of the predication map is lower than a threshold distance. The "precision" being the percentage of "hits". If the prediction map lane lines fall along the same lines as the ground truth lane lines, the precision will be high. Whereas if the prediction lane lines differ from the ground truth lane lines substantially (e.g., more than the threshold distance), the precision may be low. The "threshold" distance within which a pixel is considered a hit may be feature type dependent, such as a higher threshold for less critical feature types (e.g., features that do not influence autonomous vehicle function) and a lower threshold for critical feature types (e.g., features that govern autonomous vehicle navigation). A feature threshold may be established above which a feature is determined to be properly and accurately predicted relative to the ground truth, such as a similarity of 90% between the ground truth pixels and the prediction pixels for a given feature.

Recall of features may be calculated based on finding the indices in the binary ground truth image that indicate the presence of a feature (e.g., pixels having a value of 1). For each index, or feature pixel, the distance transform value of the prediction map may be found for the corresponding pixel of the prediction map. A pixel may be considered a hit if the distance value at the distance transform in the prediction map is below a threshold distance. The recall may be established as the percentage of "hits" from the ground truth map. Recall may provide an indication of whether a lane line was found in the prediction map. If a ground truth map includes five lane lines to identify four lanes, and the prediction map only includes two lane lines, the recall is low at 40%.

For each index pixel of the ground truth map, the distribution of distances of a corresponding pixel of the prediction map may be plotted to generate an error visualization. Similarly, for each index pixel of the prediction map, the distribution of distances of a corresponding pixel of the ground truth map may be plotted to generate an error visualization.

Beyond establishing the existence and location of features, such as lane lines, a ground truth map, through the input of a human, may have identified therein various types of features of lane lines. The prediction map may use algorithms to establish a lane line type (e.g., yellow solid, white solid, yellow dashed, white dashed, etc.) and characterize each feature and each pixel thereof according to the established feature type. Features of the same type (e.g., the same line type) may be aligned in the image analysis such that embodiments described herein can identify the precision and accuracy of feature identification for position, but also for feature identification by type. The precision and recall of various categories of features may be established to provide a better indication of the strengths of feature detection and prediction according to a certain predictive algorithm, for example.

Using the error map, various elements of the prediction map may be measured. For example, a lane width accuracy analysis could be performed to determine how accurately the prediction algorithms find the lane lines and the width of the lanes there between.

As described above, certain example embodiments of the present invention provide comprehensive analysis of the precision and recall of feature prediction based on image analysis and ground truth images. While the example embodiments describe the detection of lane lines and analysis thereof, embodiments may similarly detect any features in an environment of a vehicle. For example, embodiments of the present invention can detect road structures, such as curbs, raised medians, vehicles (moving or parked), and classify them based on extracted features and rules. As a result, embodiments of the present invention provide an automated, low-cost, accurate, and fast method for determining the accuracy and recall of detecting features of an environment using image data. Embodiments described herein may provide a degree of confidence in the accuracy (e.g., precision and recall) of prediction models that describe an environment around a vehicle to provide the vehicle and the advanced driver assistance system with a more robust evaluation of location and features surrounding the location than existing methods. Physical measuring of every environment and establishing ground truth for visual odometry for every environment is complex and would require vast resources. Through predictive methods, features in environments may be established, and methods described herein may ensure that those predictive methods are accurate and robust to improve the safety of autonomous vehicle control in an environment.

FIG. 7 is a flowchart illustrative of a method according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 104 of an apparatus 100 employing an embodiment of the present invention and executed by a processor 102 of the apparatus 100. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 7 illustrates a method for establishing the accuracy feature prediction in imagery which may be used, for example, to establish lane lines of a roadway based on an image captured by a vehicle to facilitate autonomous vehicle control. The illustrated method includes receiving a binary ground truth map of pixels at 210 and receiving a binary prediction map of pixels at 220. The pixels of the binary maps include pixels that correspond to a feature being represented as a 1 or a 0, while pixels that do not correspond to a feature are represented as the other of a 1 or a 0. The prediction map may be generated, for example, by image processing and/or algorithms configured to establish features within an image. A distance transform at each pixel of the binary ground truth map may be computed representing a distance to a closest pixel representing a feature, as shown at 230. At 240, a distance transform at each pixel of the prediction map may be computed representing a distance to a closest pixel corresponding to a feature. An accuracy of the prediction map may be established at 250 using the error map of the distance transform for each pixel. The established accuracy of the prediction map may be provided at 260 for use with an advanced driver assistance system to facilitate guidance of an autonomous vehicle. This accuracy may help determine if the accuracy is sufficient for use with various applications and systems, such as with autonomous vehicle guidance.

In an example embodiment, an apparatus for performing the method of FIG. 7 may comprise a processor (e.g., the processor 102) configured to perform some or each of the operations (210-260) described above. The processor may, for example, be configured to perform the operations (210-260) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-260 may comprise, for example, the processor 24 and/or a device or circuit for executing instructions or executing an algorithm for processing information as described above.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to:
  receive a binary ground truth map of pixels where pixels corresponding to features of an environment are assigned a 1 or a 0, and pixels not corresponding to features of the environment are assigned the other of a 1 or a 0;
  receive a binary prediction map of pixels where pixels corresponding to features of an environment are assigned a 1 or a 0, and pixels not corresponding to features of the environment are assigned the other of a 1 or a 0;
  compute a distance transform at each pixel of the binary ground truth map representing a distance to a closest pixel representing a feature;
  compute a distance transform at each pixel of the prediction map representing a distance to a closest pixel corresponding to a feature;
  establish accuracy of the binary prediction map of pixels using an error map of the distance transform for each pixel, wherein causing the apparatus to establish accuracy of the binary prediction map of pixels further comprises causing the apparatus to:
    determine, for each pixel of the binary prediction map of pixels representing a feature, a distance transform value of a corresponding pixel of the distance transform of the binary ground truth map; and
    determine a percentage of corresponding pixels of the distance transform of the binary ground truth map having a value below a threshold value to establish a precision of pixels in the binary prediction map of pixels; and
  provide the established accuracy of the binary prediction map for use with an advanced driver assistance system to facilitate guidance of an autonomous vehicle.

2. The apparatus according to claim 1, wherein the binary prediction map of pixels including features in the environment is generated using a feature prediction algorithm.

3. The apparatus according to claim 1, wherein causing the apparatus to establish accuracy of the binary prediction map of pixels using the error map of the distance transform at each pixel further comprises causing the apparatus to:
  establish a recall of features detected in the binary prediction map of pixels by causing the apparatus to:
    determine, for each pixel of the binary ground truth map of pixels representing a feature, a distance transform value of a corresponding pixel of the distance transform of the binary prediction map; and determine a percentage of corresponding pixels of the distance transform of the binary prediction map having a value below a threshold value.

4. The apparatus according to claim 1, wherein the apparatus is further caused to:
plot a distribution of errors between the distance transform of the binary ground truth map of pixels and the distance transform of the binary prediction map of pixels.

5. The apparatus according to claim 1, wherein the features in the environment include lane lines, wherein the distance transform at each pixel of the binary ground truth map comprises a distance of each pixel from a lane line pixel, and wherein the distance transform at each pixel of the binary prediction map comprises a distance of each pixel from a lane line pixel.

6. The apparatus of claim 5, wherein the apparatus is further caused to generate an error map of the distance transform for each pixel of the binary ground truth map relative to the distance transform for each pixel of the binary prediction map comprising a difference at each pixel between a distance from a lane line to a pixel of the distance transform of the binary ground truth map of pixels and a distance from a lane line to a corresponding pixel of the distance transform of the binary prediction map of pixels.

7. The apparatus of claim 1, wherein the apparatus is further caused to receive a category associated with each feature, wherein causing the apparatus to establish accuracy of the binary prediction map comprises causing the apparatus to establish accuracy of the binary prediction map on a per-category basis.

8. A computer program product comprising at least one computer-readable storage medium having computer-executable program code portions stored therein, the computer-executable program code portions comprising program code instructions that, when executed, cause an apparatus to:
receive a binary ground truth map of pixels where pixels corresponding to features of an environment are assigned a 1 or a 0, and pixels not corresponding to features of the environment are assigned the other of a 1 or a 0;
receive a binary prediction map of pixels where pixels corresponding to features of an environment are assigned a 1 or a 0, and pixels not corresponding to features of the environment are assigned the other of a 1 or a 0;
compute a distance transform at each pixel of the binary ground truth map representing a distance to a closest pixel representing a feature;
compute a distance transform at each pixel of the binary prediction map representing a distance to a closest pixel corresponding to a feature;
establish accuracy of the binary prediction map of pixels using an error map of the distance transform for each pixel, wherein causing the apparatus to establish accuracy of the binary prediction map of pixels comprises causing the apparatus to:
determine, for each pixel of the binary prediction map of pixels representing a feature, a distance transform value of a corresponding pixel of the distance transform of the binary ground truth map; and
determine a percentage of corresponding pixels of the distance transform of the binary ground truth map having a value below a threshold value to establish a precision of pixels in the binary prediction map of pixels; and provide the established accuracy of the binary prediction map for use with an advanced driver assistance system to facilitate guidance of an autonomous vehicle.

9. The computer program product according to claim 8, wherein the binary prediction map of pixels including features in the environment is generated using a feature prediction algorithm.

10. The computer program product according to claim 8, wherein the program code instructions configured to establish accuracy of the binary prediction map of pixels using the error map of the distance transform at each pixel comprise program code instructions configured to:
establish a recall of features detected in the binary prediction map of pixels by causing the apparatus to:
determine, for each pixel of the binary ground truth map of pixels representing a feature, a distance transform value of a corresponding pixel of the distance transform of the binary prediction map; and
determine a percentage of corresponding pixels of the distance transform of the binary prediction map having a value below a threshold value.

11. The computer program product according to claim 8, further comprising program code instructions configured to cause the apparatus to:
plot a distribution of errors between the distance transform of the binary ground truth map of pixels and the distance transform of the binary prediction map of pixels.

12. The computer program product according to claim 8, wherein the features in the environment include lane lines, wherein the distance transform at each pixel of the binary ground truth map comprises a distance of each pixel from a lane line pixel, and wherein the distance transform at each pixel of the binary prediction map comprises a distance of each pixel from a lane line pixel.

13. The computer program product according to claim 8, further comprising program code instructions configured to cause the apparatus to generate an error map of the distance transform for each pixel of the binary ground truth map relative to the distance transform for each pixel of the binary prediction map comprising a difference at each pixel between a distance from a lane line to a pixel of the distance transform of the binary ground truth map of pixels and a distance from a lane line to a corresponding pixel of the distance transform of the binary prediction map of pixels.

14. The computer program product according to claim 8, further comprising program code instructions configured to cause the apparatus to receive a category associated with each feature, wherein causing the apparatus to establish accuracy of the binary prediction map comprises causing the apparatus to establish accuracy of the binary prediction map on a per-category basis.

15. A method comprising:
receiving a binary ground truth map of pixels where pixels corresponding to features of an environment are assigned a 1 or a 0, and pixels not corresponding to features of the environment are assigned the other of a 1 or a 0;
receiving a binary prediction map of pixels where pixels corresponding to features of an environment are assigned a 1 or a 0, and pixels not corresponding to features of the environment are assigned the other of a 1 or a 0;
computing a distance transform at each pixel of the binary ground truth map representing a distance to a closest pixel representing a feature;

computing a distance transform at each pixel of the binary prediction map representing a distance to a closest pixel corresponding to a feature;

establishing accuracy of the binary prediction map of pixels using an error map of the distance transform for each pixel, wherein establishing accuracy of the binary prediction map of pixels comprises:

determining, for each pixel of the binary prediction map of pixels representing a feature, a distance transform value of a corresponding pixel of the distance transform of the binary ground truth map; and determining a percentage of corresponding pixels of the distance transform of the binary ground truth map having a value below a threshold value to establish a precision of pixels in the binary prediction map of pixels; and providing the established accuracy of the binary prediction map for use with an advanced driver assistance system to facilitate guidance of an autonomous vehicle.

16. The method according to claim 15, wherein the binary prediction map of pixels including features in the environment is generated using a feature prediction algorithm.

17. The method according to claim 15, wherein establishing accuracy of the binary prediction map of pixels using the error map of the distance transform at each pixel comprises:

establishing a recall of features detected in the binary prediction map of pixels by:

determining, for each pixel of the binary ground truth map of pixels representing a feature, a distance transform value of a corresponding pixel of the distance transform of the binary prediction map; and determining a percentage of corresponding pixels of the distance transform of the binary prediction map having a value below a threshold value.

18. The method according to claim 15, further comprising:

plotting a distribution of errors between the distance transform of the binary ground truth map of pixels and the distance transform of the binary prediction map of pixels.

19. The method according to claim 15, wherein the features in the environment include lane lines, wherein the distance transform at each pixel of the binary ground truth map comprises a distance of each pixel from a lane line pixel, and wherein the distance transform at each pixel of the binary prediction map comprises a distance of each pixel from a lane line pixel.

20. The method of claim 19, further comprising generating an error map of the distance transform for each pixel of the binary ground truth map relative to the distance transform for each pixel of the binary prediction map comprising a difference at each pixel between a distance from a lane line to a pixel of the distance transform of the binary ground truth map of pixels and a distance from a lane line to a corresponding pixel of the distance transform of the binary prediction map of pixels.

21. The method of claim 15, further comprising receiving a category associated with each feature, wherein establishing accuracy of the binary prediction map comprises establishing accuracy of the binary prediction map on a per-category basis.

* * * * *